United States Patent [19]
Koch

[11] Patent Number: 5,738,312
[45] Date of Patent: Apr. 14, 1998

[54] "D" RING ADAPTABLE EXTENDER

[76] Inventor: Mark A. Koch, 185 Concord Plz., St. Louis, Mo. 63128

[21] Appl. No.: 559,293

[22] Filed: Nov. 15, 1995

[51] Int. Cl.⁶ ......................................... F16L 3/22
[52] U.S. Cl. ................ 248/68.1; 248/58; 248/230.5
[58] Field of Search ............................ 248/58, 68.1, 73, 248/65, 226.11, 227.4, 251, 263, 49, 61, 63, 230.5; 174/40 CC, 154, 135; 16/114 R; 211/118, 113

[56] References Cited

U.S. PATENT DOCUMENTS

| | | | |
|---|---|---|---|
| D. 194,803 | 3/1963 | Angel et al. | 248/68.1 X |
| 569,755 | 10/1896 | Grist | 248/58 |
| 719,230 | 1/1903 | Kinchla | 248/230.5 |
| 770,278 | 9/1904 | Fletcher | 248/68.1 |
| 1,133,976 | 3/1915 | Kraus | 248/68.1 |
| 1,253,852 | 1/1918 | Mankey | 211/113 X |
| 1,315,225 | 9/1919 | Hughes | 248/68.1 |
| 1,406,811 | 2/1922 | Bachrik | 16/114 R |
| 2,098,687 | 11/1937 | Kinsfather | 248/251 X |
| 2,120,805 | 6/1938 | Houser et al. | 248/58 X |
| 4,015,625 | 4/1977 | Alexander | 248/58 X |
| 4,893,715 | 1/1990 | Papazian et al. | 211/118 |
| 4,899,415 | 2/1990 | Wheeler | 16/114 R X |

Primary Examiner—Ramon O. Ramirez
Assistant Examiner—Stephen S. Wentsler
Attorney, Agent, or Firm—Kevin L. Klug

[57] ABSTRACT

An "D" ring adaptable extender attachable to an existing and mounted conventional "D" ring. The "D" ring adaptable extender having a mounting system such that the conventional "D" ring need not be removed. The "D" ring adaptable extender quickly providing additional support space for the mounting and stringing of cables without the need for extraordinary tools.

15 Claims, 3 Drawing Sheets

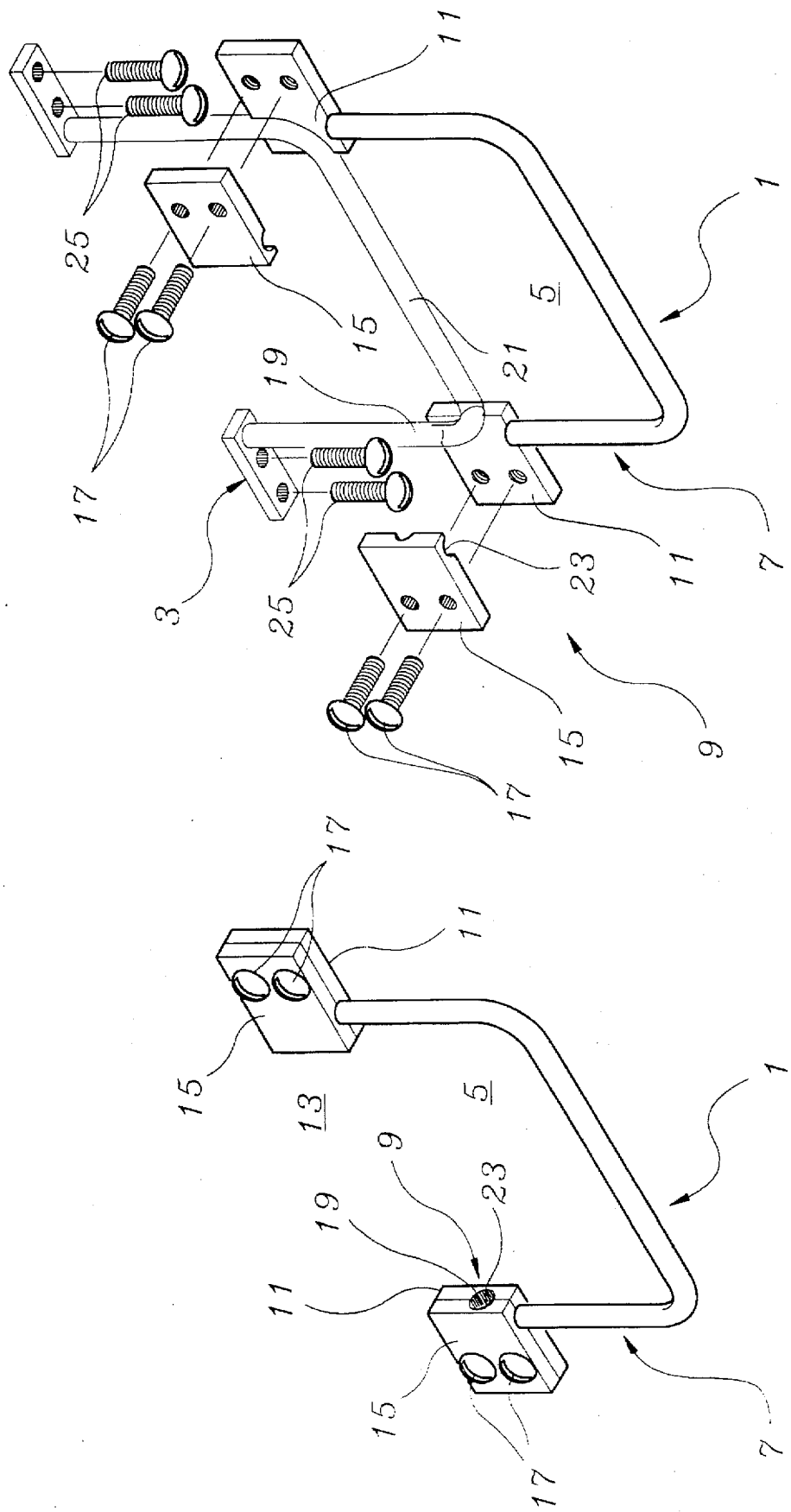

ns
"D" RING ADAPTABLE EXTENDER

BACKGROUND OF THE INVENTION

The present invention relates in general to electrical wire holding devices and particularly to an electrical wire holding device which rigidly attaches to an existing electrical wire holding device as used in buildings which have phone, computer and communications cables. The "D" ring adaptable extender of this invention significantly improves the time of stringing and running new or additional cabling in an existing building which already contains cabling supported with conventional "D" rings.

As the art currently exists, conventional "D" rings are used to hold cabling for intra-building communications and computer cables. A typical conventional "D" ring is manufactured of a rigid and often metallic material. It generally is defined by three sides of a rectangular area of approximately 3.5 inches by 5.5 inches through which cables are supported, but is also available in a variety of sizes. At the top of the conventional "D" ring structure, as defined by the open end of the three sides of the conventional "D" ring rectangular area, exists mounting holes for rigid screw attachment to an existing building structure. As more and more communications and computer cables are installed within a building, the existing conventional "D" rings are eventually filled with cables and are unable to accept and support more cables.

With the current exponential growth of communication and computer wiring within buildings, presently installed "D" rings are quickly filling with communications and/or computer cables. Once a conventional "D" ring is filled with cables, an electrician's options are to install a set of new conventional "D" rings or to use the art of the present invention in order to install a new set of cables. Often, it is impractical due to space limitations, absence of anchoring points and/or the installation time requirements to install a new set of conventional "D" rings in order to support the installation of a new set of cables. The art of the present invention allows the electrician to quickly install new "D" rings onto the presently attached conventional "D" rings, without the need for new holes or screws, and thereby allow the expansion of existing conventional "D" rings for support of new cables. As such, the conventional alternative is undesirable from both a convenience and efficiency standpoint.

Accordingly, it is an object of the present invention to provide a "D" ring adaptable extender by which a previously installed conventional "D" ring may be expanded to support additional cables once the existing conventional "D" ring is filled.

Another object of the present invention is to provide a ring adaptable extender which is installed quickly, with a minimum of effort, and with a minimum of specialty tools.

A further object of the present invention is to provide a "D" ring adaptable extender which is structurally rigid and capable of supporting at least as many cables as the "D" ring upon which it is attached.

A still further object of the present invention is to provide a form of a "D" ring adaptable extender which will suit the needs of most electricians and engineers who are responsible for the installation of building cables.

A still further object of the present invention is to provide a form of a "D" ring adaptable extender which is economical to manufacture and to use.

SUMMARY OF THE INVENTION

To accomplish the foregoing and other objects of this invention there is provided a "D" ring adaptable extender for allowing existing conventional "D" ring structures to support additional cables without removal from the supporting structure onto which the existing "D" ring structures are attached. The "D" ring adaptable extender is a substantially U-shaped member having a mounting means by which it is attached to an existing, installed and mounted conventional "D" ring.

In the preferred embodiment described herein, the substantially U-shaped member is manufactured in a similar width, shape and proportion as the conventional "D" ring upon which it is mounted, with the exception of the specialty mounting system which is attached to the "D" ring adaptable extender. The novelty of this invention is the combination of the existing conventional "D" ring shape with the specialty mounting system necessary for attachment to existing conventional "D" ring structures. The mounting system is substantially defined by a clamping means by which the "D" ring adaptable extender is held and mounted to the existing, installed and mounted conventional "D" ring.

Also, in the preferred embodiment, the mounting system is easily installed by use of one or more screws or by self holding inserts which are inserted into mounting holes on the mounting system.

In alternate embodiments, the "D" ring adaptable extender may be formed from a conventional "D" ring and a specialty mounting system for use with conventional "D" rings. Both the preferred and alternative embodiments may utilize a number of clamping methods which utilize a similar clamping action as the preferred embodiment but which apply the clamping action at different locations on the existing, installed and mounted conventional "D" ring in order to provide yet more alternative embodiments.

Further alternative embodiments may utilize various alterations to the existing "D" ring such that the mounting system need not rely upon clamping action but instead rely upon attachment by screw means.

The "D" ring adaptable extender can be manufactured of different materials, and also in different sizes, shapes and colors. In the preferred embodiment described herein, the "D" ring adaptable extender comprises an aluminum alloy material.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a perspective view of a preferred embodiment of the "D" ring adaptable extender;

FIG. 2 is a perspective view of a preferred embodiment of the "D" ring adaptable extender mounted onto a conventional "D" ring;

DETAILED DESCRIPTION

Figure 4:
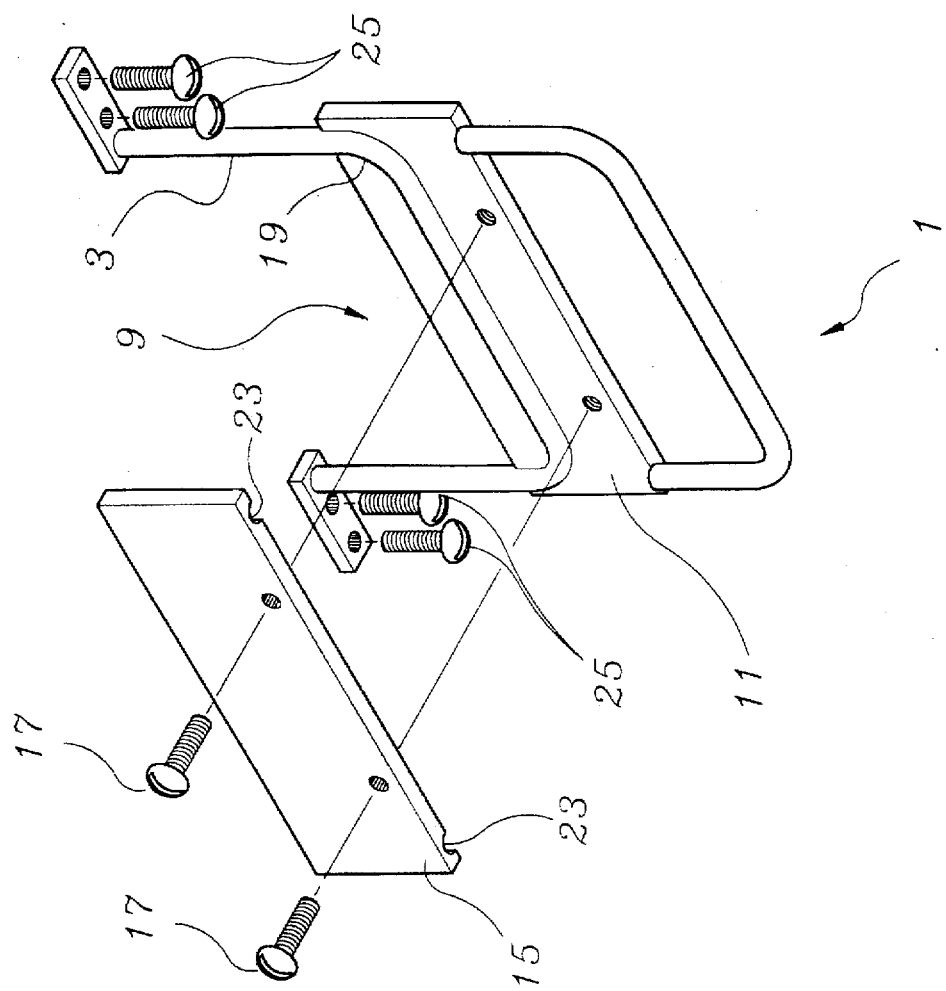
FIG. 4 is a perspective view of another alternative embodiment of the "D" ring adaptable extender which mounts onto a conventional "D" ring.

Referring now to the drawings there is shown a preferred embodiment in FIGS. 1–2 of the "D" ring adaptable extender 1. The "D" ring adaptable extender 1 is described connected with a conventional "D" ring 3. A conventional "D" ring 3 typically attaches to a building or structure in which it is used by the use of "D" ring attaching screws 25. The "D" ring adaptable extender 1 is particularly adapted for attachment onto an existing conventional "D" ring 3 in such a manner as to not hinder the functionality of the conventional "D" ring 3 while also providing for a means to support additional cable installation within the rectangular area 5 of the "D" ring adaptable extender 1 without removing the conventional "D" ring 3.

In a preferred embodiment, the "D" ring adaptable extender 1 comprises a substantially U-shaped member 7 rigidly attached to a mounting system 9. The mounting system 9 is composed of two clamping first halves 11 each rigidly attached to a different side of the "D" ring adaptable extender open end 13 of the substantially U-shaped member 7 and two clamping second halves 15 each attached with clamp attaching screws 17 to a different first half 11 of the mounting system 9. Each of the clamping first halves 11 and each of the clamping second halves 15 contain a first half recessed portion 19 and a second half recessed portion 23 respectively which allows clamping and securing of the conventional "D" ring closed end 21 between the clamping first halves 11 and the clamping second halves 15 when the clamp attaching screws 17 are tightened in place, thereby forcing both the first half recessed portion 19 and the second half recessed portion 23 to intimately contact the conventional "D" ring closed end 21.

In operation, installation of the "D" ring adaptable extender 1 onto an existing, installed and mounted conventional "D" ring 3 begins by removing all clamp attaching screws 17 and separating all clamping first halves 11 from the clamping second halves 15. Upon separation, each of the clamping first halves 11 are contacted onto the conventional "D" ring closed end 21 in the first half recessed portion 19. After contacting, each of the clamping second halves 15 are placed into contact with the conventional "D" ring closed end 21 in the second half recessed portion 23 and affixed to their respective first halves 11 by the use of one or more clamp attaching screws 17. After the clamp attaching screws 17 are tightened, the "D" ring adaptable extender 1 is ready to accept and support cables, wires or other hardware which will fit onto or into the "D" ring adaptable extender 1.

In a preferred embodiment, the "D" ring adaptable extender 1 is composed of an aluminum alloy type material although other material types may be used and may contain properties which are more desirable for the intended location and use.

Figure 3:
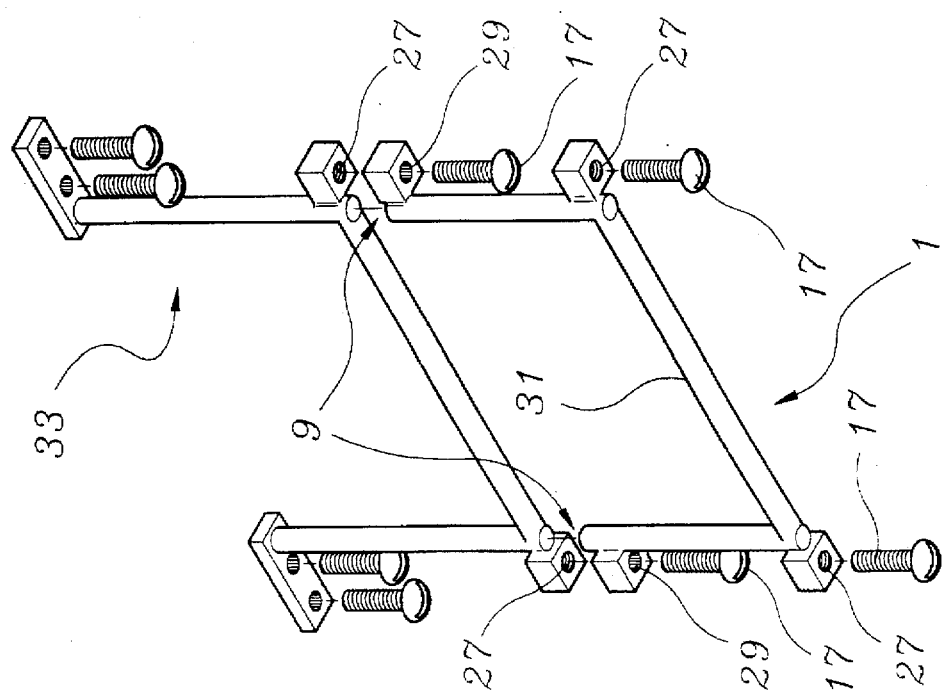
FIG. 3 is a perspective view of an alternative embodiment of the "D" ring adaptable extender mounted onto a modified "D" ring.

FIG. 3 shows an alternate embodiment of the "D" ring adaptable extender 1 having an alternate mounting system 9 yet retaining the substantial form and features of the preferred embodiment. This mounting system 9 is characterized by a pair of threaded extensions 27 rigidly attached to the conventional "D" ring closed end 21, thereby forming a modified conventional "D" ring 33, and a pair of mounting extensions 29 attached to each portion of the "D" ring adaptable extender open end 13. Clamp attaching screws 17 inserted through the mounting extensions 29 firmly hold the "D" ring adaptable extender 1 to each of the two threaded extensions 27 and thereby cause the "D" ring adaptable extender 1 to be rigidly mounted onto the modified conventional "D" ring 3, provided that the threaded extensions 27 are rigidly mounted onto the conventional "D" ring 3. The alternate embodiment also contains two rigidly attached threaded extensions 27 at the adaptor closed end 31 which are spaced such that another conventional "D" ring 3 or "D" ring adaptable extender 1 may be attached to an existing and attached "D" ring adaptable extender 1. In operation, this alternate embodiment is simply placed against the modified conventional "D" ring 33 and the clamp attaching screws 17 are inserted and firmly tightened.

FIG. 4 shows another alternate embodiment of the "D" ring adaptable extender 1 having an alternate mounting system 9 yet retaining the substantial form and features of the preferred embodiment. The mounting system 9 of the alternate embodiment differs from the preferred embodiment by its use of only one clamping first half 11 and one clamping second half 15 which are attached with clamp attaching screws 17. Nevertheless, the mounting system 9 does not substantially change in that it mounts rigidly onto the conventional "D" ring closed end 21 and contains both a first half recessed portion 19 and a second half recessed portion 23. In operation, this alternated embodiment operates as the preferred embodiment with the exception of only one clamping first half 11 and one clamping second half 15 need be used.

Figure 5:
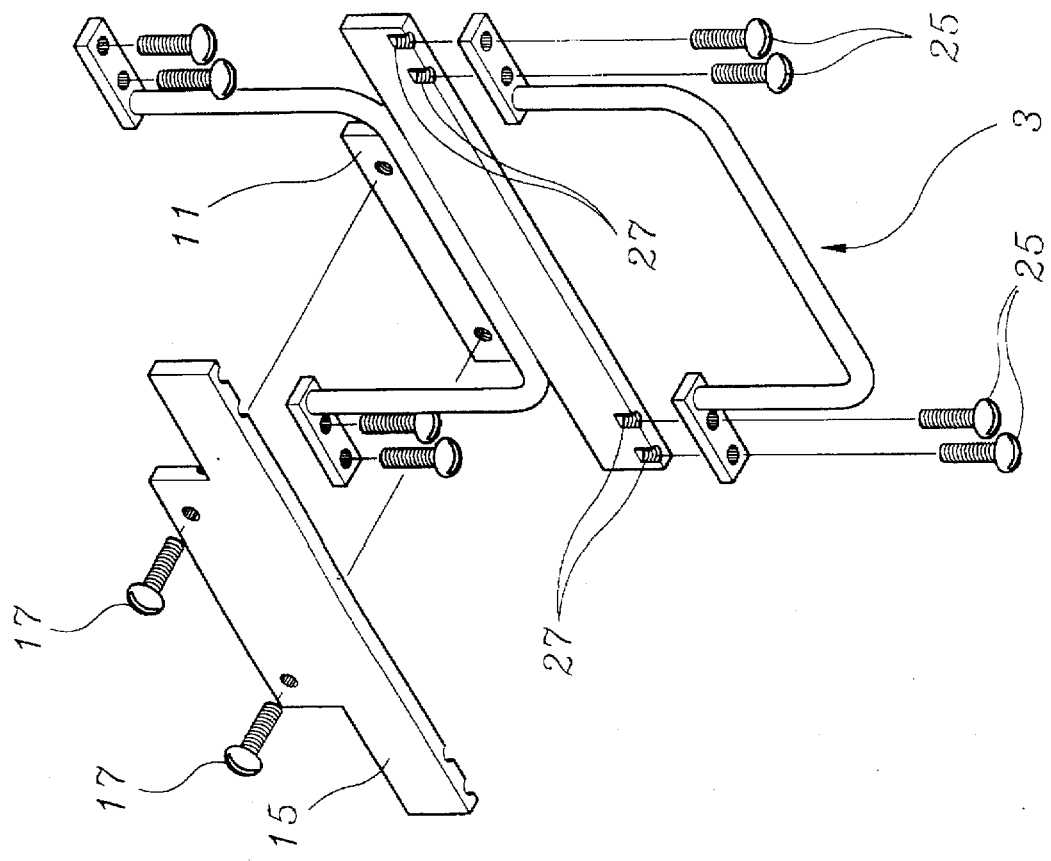
FIG. 5 is a perspective view of still another alternative embodiment of the "D" ring adaptable extender which mounts onto a conventional "D" ring and uses a conventional "D" ring to form the "U" shaped member of the "D" ring adaptable extender.

FIG. 5 shows an yet another alternate embodiment of the "D" ring adaptable extender 1 having an alternate mounting system 9 which allows a conventional "D" ring 3 to be used as the substantially U-shaped member 7 while retaining the substantial form and features of the preferred embodiment. The mounting system 9 of this alternate embodiment differs from the preferred embodiment by its use of only one clamping first half 11 and one clamping second half 15 which are attached with clamp attaching screws 17, which thereby form a mounting system 9 containing a pair of threaded extensions 27 spaced such that a conventional "D" ring 3 may be mounted onto the mounting system 9 with conventional "D" ring attaching screws 25. In operation, the mounting system 9 is mounted to a conventional "D" ring 3 as described pursuant to FIG. 4 with a conventional "D" ring 3 then placed against the threaded extensions 27 and attached via conventional "D" ring attaching screws 25.

Figure 6:
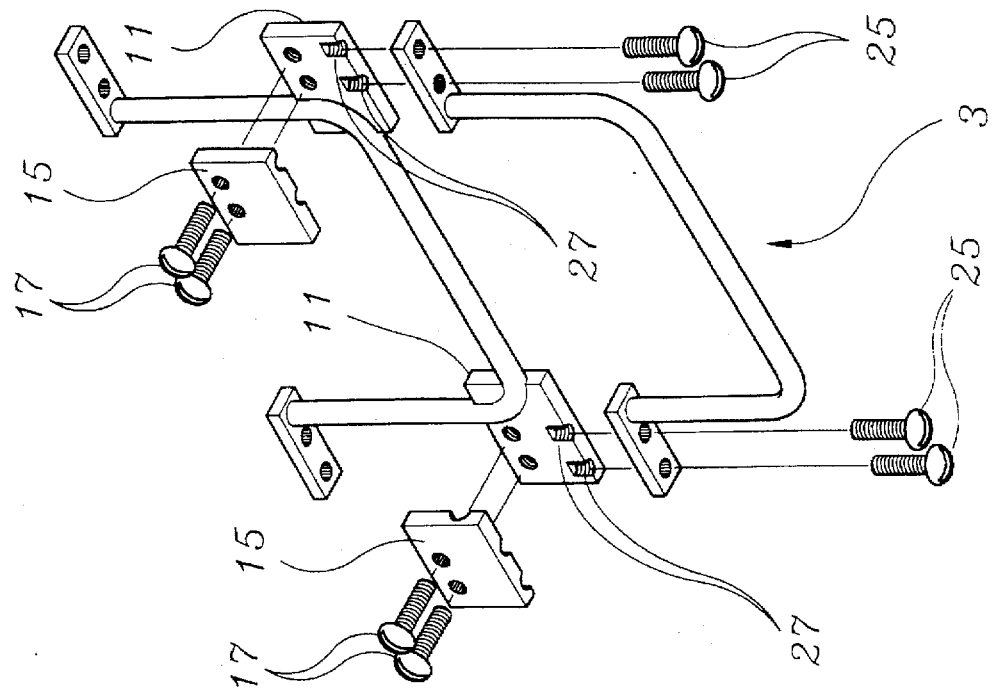
FIG. 6 is a perspective view of still a further alternative embodiment of the "D" ring adaptable extender which mounts onto a conventional "D" ring and uses a conventional "D" ring to form the "U" shaped member of the "D" ring adaptable extender.

FIG. 6 shows yet a further alternate embodiment of the "D" ring adaptable extender 1 having an alternate mounting system 9 which allows a conventional "D" ring 3 to be used as the substantially U-shaped member 7 while retaining the substantial form and features of the preferred embodiment. The mounting system 9 of this alternate embodiment includes all of the parts and features of the preferred embodiment with the exception that the clamping first halves 11 and the clamping second halves 15, when combined, each form a threaded extension 27 spaced on and relative to the conventional "D" ring 3, upon which they are mounted, such that a conventional "D" ring 3 will mount direct onto the mounting system with use of conventional "D" ring attaching screws 25. In operation, this alternative embodiment is installed as that of FIG. 5 with the exception that two clamping first halves 11 and two clamping second halves 15 are used instead of only one for each.

From the foregoing description those skilled in the art will appreciate that all objects of the present invention are realized. A "D" ring adaptable extender has been shown and described which allows expansion of a conventional "D" ring with minimum time and effort. The device of this invention is convenient and easy to use. The preferred design of the present invention, as well as alterations that will now be apparent to those skilled in the art, all allow use of the device with any conventional "D" ring.

The present invention, in alternate embodiments, is available in a variety of shapes and sizes.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A "D" ring adaptable extender for substantially expanding the capacity of a conventional "D" ring comprising:
   a substantially U-shaped member, having an open end, a closed end, and a mounting system, said mounting system comprising one or more clamping first halves, rigidly attached to said open end, and one or more clamping second halves removably rigidly attached to said one or more clamping first halves, whereby said removable rigid attachment of said one or more clamping first halves and said one or more clamping second halves are capable of clamping and securing a conventional "D" ring closed end; and
   said one or more clamping first halves and said one or more clamping second halves having one or more recessed portions which follow a substantially ninety degree path and are capable of contacting said conventional "D" ring.

2. The "D" ring adaptable extender as defined in claim 1 further comprising one or more fasteners interdisposed into said one or more clamping second halves and into said one or more clamping first halves thereby causing said one or more clamping second halves to be removably rigidly attached to said one or more clamping first halves.

3. The "D" ring adaptable extender as defined in claim 2 wherein said one or more fasteners are screws.

4. A "D" ring adaptable extender for substantially expanding the capacity of a conventional "D" ring comprising:
   a substantially U-shaped member having an open end and a closed end, said open end removably rigidly attached to a mounting system, said mounting system comprising one or more clamping first halves, and one or more clamping second halves each removably rigidly attached to said one or more clamping first halves, said conventional "D" ring capable of being interdisposed between said clamping first halves and said clamping second halves.

5. The "D" ring adaptable extender as defined in claim 4 wherein said substantially U-shaped member is removably rigidly attached to said mounting system with screws.

6. The "D" ring adaptable extender as defined in claim 4 further comprising one or more fasteners interdisposed into said one or more clamping second halves and into said one or more clamping first halves thereby causing each of said one or more clamping second halves to be each removably rigidly attached to said one or more clamping first halves.

7. The "D" ring adaptable extender as defined in claim 6 wherein said one or more fasteners are screws.

8. The "D" ring adaptable extender as defined in claim 4 further comprising one or more recessed portions on said clamping first halves whereby said recessed portions are capable of contacting said conventional "D" ring.

9. The "D" ring adaptable extender as defined in claim 4 further comprising one or more recessed portions on said clamping second halves whereby said recessed portions are capable of contacting said conventional "D" ring.

10. A method for expanding the capacity of a conventional "D" ring, the method comprising the steps of:
    providing a substantially U-shaped member of aluminum alloy material, comprising an open-end and a closed-end;
    providing a mounting system, said mounting system capable of being rigidly attached to said conventional "D" ring;
    connecting said mounting system to said conventional "D" ring;
    connecting said open-end of said U-shaped member to said mounting system;
    inserting one or more cables through said substantially U-shaped member.

11. The method for expanding the capacity of the conventional "D" ring as defined in claim 10, the method of providing said mounting system further comprising the steps of:
    providing a clamping first half and a clamping second half;
    placing said conventional "D" ring between said first half and said second half;
    releasably connecting said clamping first half and said clamping second half;
    whereby said mounting system is connected to said conventional "D" ring.

12. The method for expanding the capacity of the conventional "D" ring as defined in claim 11, the method of providing said mounting system further comprising the steps of:
    providing a recessed portion on said clamping first half and said clamping second half;
    whereby said conventional "D" ring may fit when said mounting system is connected to said conventional "D" ring.

13. A "D" ring adaptable extender system for expanding the capacity of a conventional "D" ring having a closed end, said "D" ring adaptable extender system comprising:
    a mounting system comprising one or more clamping first halves and one or more clamping second halves, said one or more first halves being rigidly attachable to said one or more second halves with one or more fasteners such that said mounting system is capable of being clamped to said closed end of said conventional "D" ring;
    a substantially U-shaped member, having an open end and a closed end, said open end of said substantially U-shaped member having a mounting means for removably attaching said substantially U-shaped member to said mounting system.

14. The "D" ring adaptable extender system as defined in claim 13 wherein said one or more fasteners are screws.

15. The "D" ring adaptable extender system as defined in claim 13 wherein said mounting system forms one or more threaded extensions, a portion of said one or more threaded extensions are formed by said one or more first halves, another portion of said one or more threaded extensions are formed by said one or more second halves such that said one or more threaded extensions are formed when said one or more first halves are rigidly attached to said one or more second halves, said means for removably attaching comprises threaded fasteners, and said threaded fasteners are capable of being threadably received in said one or more threaded extensions.

* * * * *